United States Patent [19]

Katayama

[11] Patent Number: 4,461,023

[45] Date of Patent: Jul. 17, 1984

[54] REGISTRATION METHOD OF REGISTERED WORDS FOR USE IN A SPEECH RECOGNITION SYSTEM

[75] Inventor: Hirohiko Katayama, Kawasaki, Japan

[73] Assignee: Canon Kabushiki Kaisha, Tokyo, Japan

[21] Appl. No.: 318,262

[22] Filed: Nov. 4, 1981

[30] Foreign Application Priority Data

Nov. 12, 1980 [JP] Japan .................. 55-159235

[51] Int. Cl.³ .............................................. G10L 1/00
[52] U.S. Cl. ........................................................ 381/43
[58] Field of Search .................. 179/1 SB, 1 SD; 364/513, 513.5; 381/41–43

[56] References Cited

U.S. PATENT DOCUMENTS 3,470,321  9/1969  Dersch ........................... 179/1 SD
3,509,280  4/1970  Jones ............................. 179/1 SB
3,770,892  11/1973  Clapper ......................... 179/1 SD Primary Examiner—E. S. Matt Kemeny
Attorney, Agent, or Firm—Fitzpatrick, Cella, Harper & Scinto

[57] ABSTRACT

A speech recognition system comprises input unit for inputting speech words, analyzing unit for analyzing and patterning the speech words inputted by the input unit, first memory unit for storing the patterns of the speech words analyzed and patterned by the analyzing unit, and second memory unit for storing each as the speech words inputted by the input unit. The system also comprises address specifying unit for specifying the same address of the speech words analyzed and patterned and stored in the first memory unit and the speech words stored in the second memory unit the content of the address specifying unit being updated in response to each of the speech words inputted by the input unit, and voice output unit for outputting the speech words stored in the second memory unit addressed in accordance with the content of the address unit.

12 Claims, 2 Drawing Figures

REGISTRATION METHOD OF REGISTERED WORDS FOR USE IN A SPEECH RECOGNITION SYSTEM

BACKGROUND OF THE INVENTION

1. Field of the Invention

The present invention relates to a speech or spoken recognition system having an additional memory for storing speech words to be registered and a voice output means for reproducing the stored registered speech words when the speech words are re-registered.

2. Description of the Prior Art

In recent years, as the speech recognition rate in the speech recognition system was increased, a voice-input typewriter using the speech recognition system has been put into use. In this type of voice-input typewriter, a text to be typed is inputted by voice to a voice input device and the recognition result by the voice input device is printed by a printer. In the speech recognition system used in such a voice input device, speech words to be recognized are registered or entered in the system and a voice pattern of a word to be recognized is compared with voice patterns of the registered words to select a registered word having the closest voice pattern. In order to register the words in a conventional speech recognition system, a numeric display for displaying registered locations and a table of the numerals versus the registered words are provided and the words are registered repeatedly several times while watching the display and the table to generate well-averaged registered patterns. This method works satisfactorily when the number of words registered is small, but when the number of words registered is large a long time is required to prepare the table and register the words. In addition, in the second and subsequent runs of registration, the comparison operation is troublesome because the registrations must be made while watching the table, and it is difficult to input the voice by a microphone with a constant magnitude.

SUMMARY OF THE INVENTION

It is an object of the present invention to provide a speech recognition system which does not need a table and can easily register well-averaged voice patterns of a large number of words.

It is another object of the present invention to provide a speech recognition system having registered word generators one for each address of a memory which stores registered words.

It is a further object of the present invention to provide a speech recognition system including input means for inputting speech words to be registered, analyzing means for analyzing and for patterning the speech words inputted by the input means, first memory means for storing the patterns of the speech words analyzed and patterned by the analyzing means, second memory means for storing the speech words inputted by the input means, and address specifying means for specifying the same address of the first memory means which stores the analyzed and patterned speech words and the speech words stored in the second memory means. The content of the address specifying means is updated in response to each speech word inputted by the input means. The speech recognition system also includes voice output means for outputting the words stored in the second memory means addressed in accordance with the content of the address counter.

DETAILED DESCRIPTION OF THE PREFERRED EMBODIMENTS

One embodiment of the present invention is now explained with reference to a block diagram shown in FIG. 1.

Figure 1:
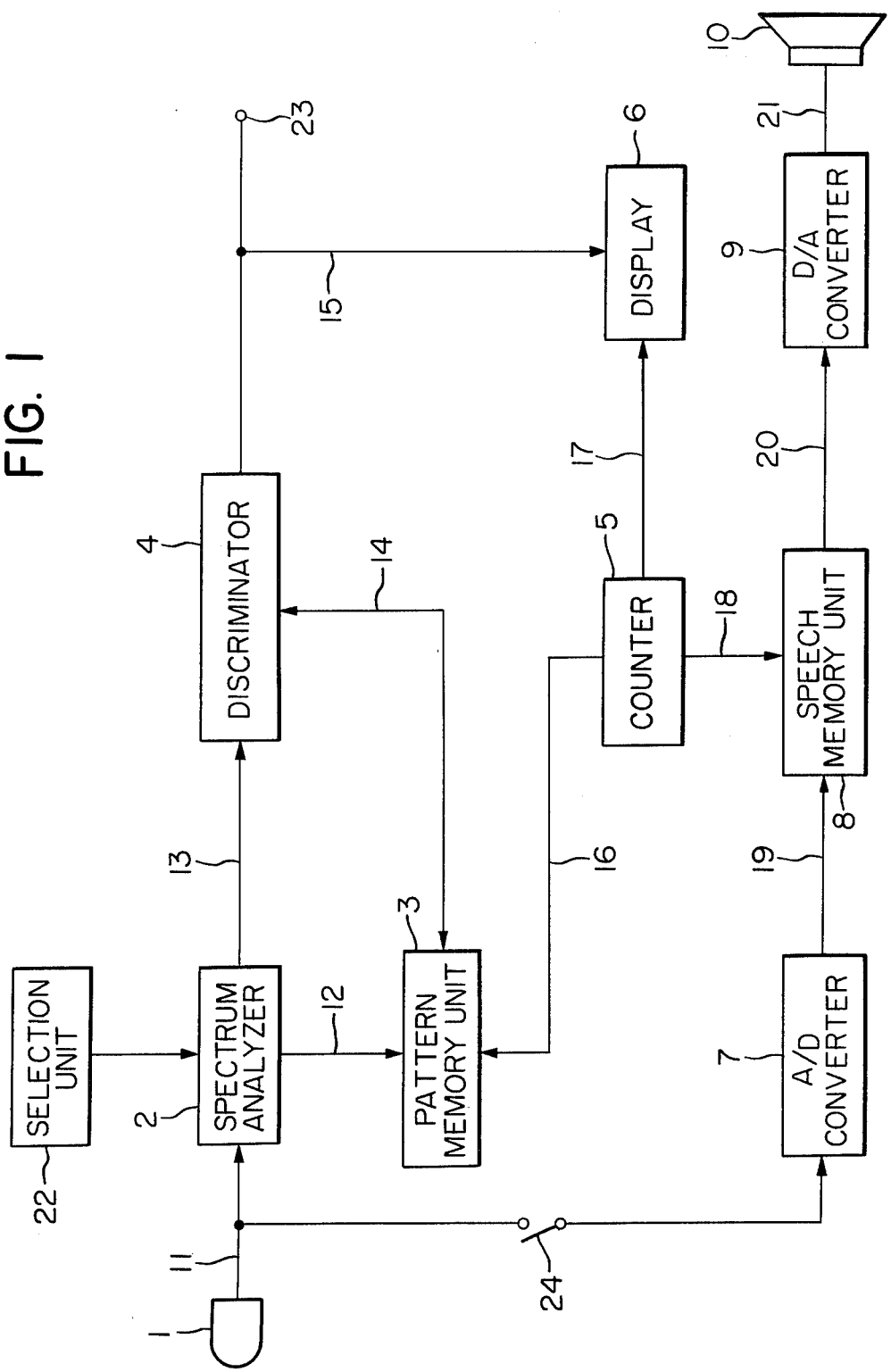
FIG. 1 shows a block diagram of a speech recognition system in accordance with one embodiment of the present invention.

In FIG. 1, numeral 1 denotes a microphone for inputting voice. Through the microphone 1, words to be registered and a word to be recognized are supplied to a spectrum analyzer 2 which analyzes and patterns the inputted voice to speech or spoken words. Only the words to be registered are supplied to an A/D converter 7 in a voice generator. The analyzed and patterned outputs from the spectrum analyzer 2 for the words to be registered are supplied to a pattern memory 3 while the output from the spectrum analyzer 2 for the word to be recognized is supplied to a discriminator 4. Connector terminal 23 connects the output from discriminator 4 to a printer such as a voice-input typewriter and the like. The pattern memory 3 stores the patterns of the words to be registered which have been decomposed to frequency components by the spectrum analyzer 2. The storage locations are specified by a counter 5. The discriminator 4 compares the pattern of the word to be recognized which has been analyzed by the spectrum analyzer 2 with the pattern of the registered words stored in the pattern memory 3 and selects the closest pattern and supplies it to a display 6. The address of the selected registered word pattern is also displayed on the display 6. On the other hand, the speech words to be registered which were inputted through the microphone 1 are supplied to the A/D converter 7 where they are digitized and the digital output signals are stored in a voice memory 8 at storage locations specified by the counter 5. When re-registered, the digital signals of the registered words are also addressed by the counter 5. The output of the voice memory 8 is supplied to a D/A converter 9 where it is converted to an analog signal, which is then supplied to a speaker 10 to reproduce the voice of the registered word. Numeral 22 denotes a selector having a registration key (not shown) and a recognition key (not shown). By depressing either the registration key or the recognition key, the spectrum analyzer 2 determines whether it is to supply the patterned speech word to the pattern memory 3 or to the discriminator 4. In other words, it determines whether the speech words inputted by the microphone 1 is the word to be registered or the word to be recognized. Numeral 24 denotes a switch which is turned on when the registration key is depressed to input the speech words from the microphone 1 as the word to be registered. Numerals 11 to 21 denote signal lines for transmitting and receiving signals among the respective blocks.

The operation of the speech recognition system thus constructed is now explained. When the speech word is to be registered, the registration key of the selector 22 is first depressed and the word to be registered is inputted from the microphone 1. The word to be registered inputted from the microphone 1 is supplied to the spectrum analyzer 2 through the signal line 11 and analyzed and patterned thereby. The patterned word to be registered is supplied to the pattern memory 3 through the signal line 12 and stored therein at the address specified by the counter 5. On the other hand, the word to be registered inputted from the microphone 1 is also supplied to the A/D converter through the switch 24 which has been turned on in response to the depression of the registration key of the selector 22 and converted to a digital signal. The resulting digital signal is supplied to the voice memory 8 through the signal line 19 and stored therein at the address specified by the counter 5. The address signals supplied from the counter 5 to the pattern memory 3 and the voice memory 8 are identical. After the other words to be registered have been registered in a similar way, a second run of registration begins. In the prior art speech recognition system discussed on pages 1 and 2 of the present application, the second and subsequent runs of registration must be done by watching and comparing the table of the registered words and the display on which the current registered address is displayed. In the present speech recognition system, before the second run of registration begins, the digital signals of the registered words are read out of the voice memory 8 by the instruction from the counter 5 in the sequence of the addresses in the previous run. When the digital signal of the first registered word is first read out, the digital signal is converted to an analog signal by the D/A converter 9 and the analog signal is then converted to voice by the speaker 10. One who is to register his or her speech word again says the same registered word into the microphone 1 while listening the voice reproduced by the speaker 10. After the first word has been re-registered, the next registered word stored in the voice memory 8 is specified by the counter 5 and it is supplied to the D/A converter 9 and the speaker 10 to reproduce the same voice as originally inputted for registration. In the present invention, in the second run of registration, i.e., after the first run of registration has been completed, usually only registered words having low recognition rates are re-registered selectively. The person, who is to register his or her speech word, again registers the speech word while listening to the reproduced voice. The above operation is repeated each time when the registered words registered in the previous run are sequentially reproduced by the speaker 10 until the second run of registration is completed. By repeating third, fourth or more runs in the same manner, well-averaged registered patterns can be produced.

Figure 2:
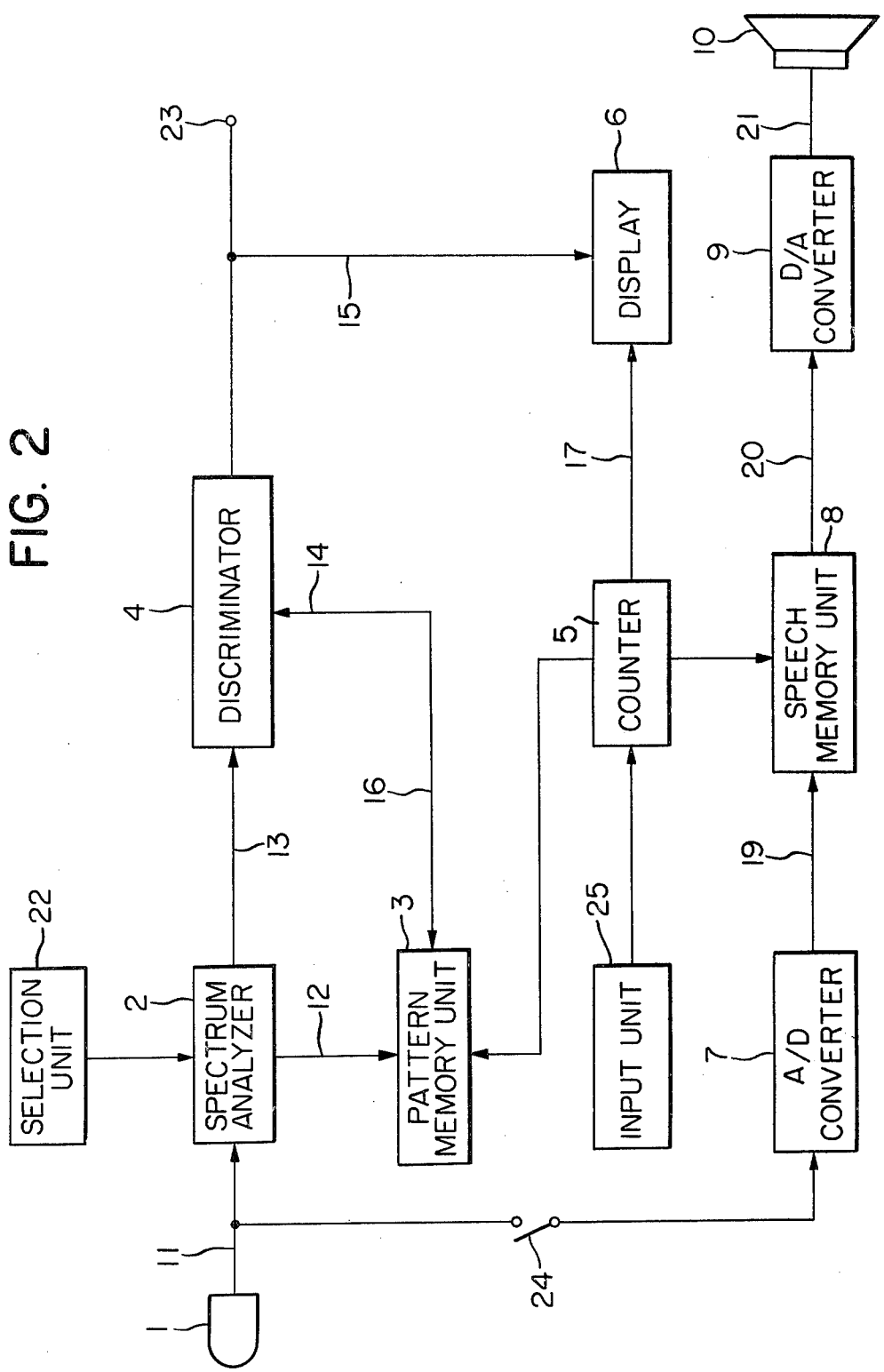
FIG. 2 shows a block diagram of a speech recognition system in accordance with another embodiment.

FIG. 2 shows a block diagram of a speech recognition system in accordance with another embodiment of the present invention. In FIG. 2, like elements to those shown in FIG. 1 are designated by the like numerals. The present embodiment differs from the previous embodiment in that in the second run of registration after the first run of registration, only the registered words having low recognition rates are selectively re-registered. In this case, the counter 5 is set by an input unit 25 to specify the addresses of the pattern memory 3 and the voice memory 8. The registered word is read out of the voice memory 8 from the address specified by the counter 5 and supplied to the D/A converter 9 where it is converted to an analog signal which is reproduced as voice by the speaker 10. The person who is to register the speech word reinputs the speech word while listening to the voice from the speaker 10 and the word to be re-registered is analyzed and patterned by the spectrum analyzer 2 and the pattern of the word to be re-registered is stored in the pattern memory 3 at the address specified by the input unit 25. The input unit 25 comprises ten numeric keys and a clear key so that the counter 5 is set by depressing selected one or ones of the ten numeric keys. When the next desired registered word is to be re-registered, the clear key of the input unit 25 is depressed to clear the content of the counter 5 and then the content of the counter 5 is updated by depressing desired one or ones of the ten numeric keys.

What I claim is:

1. A speech recognition system comprising:
    input means for inputting spoken words;
    analyzing means for analyzing and for patterning said spoken words inputted by said input means;
    first memory means for storing the patterns of said spoken words analyzed and patterned by said analyzing means;
    second memory means for storing each of said spoken words inputted by said input means;
    address specifying means for specifying the same address of said spoken words analyzed and patterned and stored in said first memory means and said spoken words stored in said second memory means, the content of said address specifying means being updated in response to each of said spoken words inputted by said input means; and
    voice output means for outputting said spoken words stored in said second memory means addressed in accordance with the content of said address specifying means.

2. A speech recognition system according to claim 1, further comprising display means for displaying the content of said address specifying means.

3. A speech recognition system according to claim 1, further comprising discrimination means for selecting from said first memory means the closest pattern to a spoken word inputted by said input means and analyzed and patterned by said analyzing means.

4. A speech recognition system according to claim 1, further comprising instruction means for instructing whether said spoken words inputted by said input means are to be registered or to be recognized.

5. A speech recognition system according to claim 4, wherein said instruction means includes a registration key and a recognition key.

6. A speech recognition system according to claim 1, wherein said address specifying means includes a counter.

7. A speech recognition system according to claim 1, wherein said input means includes a microphone.

8. A speech recognition system according to claim 1, wherein said voice output means includes a speaker.

9. A speech recognition system, comprising:
    input means for inputting spoken words to be registered;
    analyzing means for analyzing and for patterning said spoken words inputted by said input means;
    first memory means for storing patterns of said spoken words analyzed and patterned by said analyzing means;
    second memory means for storing spoken words to be produced as voice output which words correspond to the patterns of said spoken words in said first memory means;
    address specifying means for specifying an address for said first memory means and said second memory means;

setting means for setting the address of said address specifying means; and voice output means for outputting spoken words stored in the address specified and set by said address specifying means and said setting means.

10. A speech recognition system according to claim 9, further comprising display means for displaying the content of said address specifying means.

11. A speech recognition system according to claim 9, further comprising discrimination means for selecting from said first memory means the closest pattern to a spoken word inputted by said input means and analyzed and patterned by said analyzing means.

12. A speech recognition system according to claim 9, wherein said setting means includes a plurality of numeric keys.

* * * * *